United States Patent
deBardelaben (12)

(10) Patent No.: US 6,658,470 B1
(45) Date of Patent: Dec. 2, 2003

(54) CENTRALIZED LOGGING OF GLOBAL RELIABILITY, AVAILABILITY, AND SERVICEABILITY (GRAS) SERVICES DATA FOR A DISTRIBUTED ENVIRONMENT AND BACKUP LOGGING SYSTEM AND METHOD IN EVENT OF FAILURE

(75) Inventor: Sean deBardelaben, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,736

(22) Filed: Dec. 17, 1999

(51) Int. Cl.[7] ..................... G06F 15/173; G06F 15/177; G06F 17/30; G06F 12/00

(52) U.S. Cl. ..................... 709/224; 709/223; 709/220; 707/10; 707/204

(58) Field of Search ................................. 709/238, 224, 709/213, 223, 220, 246–247; 707/204, 3–10; 714/4

(56) References Cited

U.S. PATENT DOCUMENTS

| | | | |
|---|---|---|---|
| 4,590,550 A | | 5/1986 | Eilert et al. |
| 4,819,159 A | * | 4/1989 | Shipley et al. ................. 714/19 |
| 5,247,664 A | * | 9/1993 | Thompson et al. ............ 707/10 |
| 5,341,477 A | * | 8/1994 | Pitkin et al. ................. 709/226 |
| 5,410,545 A | | 4/1995 | Porter et al. |
| 5,463,768 A | * | 10/1995 | Cuddihy et al. ............... 714/37 |
| 5,606,693 A | | 2/1997 | Nilsen et al. |
| 5,608,446 A | * | 3/1997 | Carr et al. ................... 725/114 |
| 5,668,986 A | | 9/1997 | Nilsen et al. |
| 5,696,701 A | * | 12/1997 | Burgess et al. ................ 714/25 |
| 5,758,071 A | * | 5/1998 | Burgess et al. .............. 709/220 |
| 5,796,633 A | * | 8/1998 | Burgess et al. .............. 702/187 |
| 5,857,190 A | * | 1/1999 | Brown ......................... 707/10 |

(List continued on next page.)

OTHER PUBLICATIONS

Orr et al., Strange Bedfellows: Issues in Object Naming Under Unix, 1993, IEEE, pp. 141–145.*

Dharap et al., Type structured file system, 1993, IEEE, pp. 208–212.*

Khare, Rohit, What's in a name? Trust., Dec. 1999, Internet Computing, pp. 80–84.*

*Primary Examiner*—Krisna Lim
*Assistant Examiner*—Adekunle O Adegorusi
(74) *Attorney, Agent, or Firm*—Leslie A. Van Leeuwen; Bracewell & Patterson, L.L.P.

(57) ABSTRACT

The present system and method logs global reliability, availability, and serviceability (GRAS) services data for runtime environment (RTE) systems or applications in a central repository within a distributed environment. A backup logging system and method in the event of a failure or error in the centralized logging system and method are also provided. An RTE system allows itself to self-configure and self-modify itself to designate that it has a GRAS manager for centralized logging system and method in the event of a failure or error. The RTE systems are directed to log the GRAS services data to a central repository managed and maintained by a designated GRAS manager. The GRAS manager manages and maintains the logged GRAS services data in the central repository for the RTE applications, and the GRAS manager references to access the central repository by the RTE applications for the GRAS services data that are related to respective GRAS services of the RTE applications. A shared namespace is referenced and shared by and published among the RTE applications. At least one other GRAS manager is searched for in an event of failure of the GRAS manager, and at least one other GRAS manager is designated in place of the designated GRAS manager in the event of the failure of the GRAS manager.

18 Claims, 6 Drawing Sheets

U.S. PATENT DOCUMENTS

| | | | | |
|---|---|---|---|---|
| 5,864,654 A | * | 1/1999 | Marchant | 714/3 |
| 5,893,116 A | * | 4/1999 | Simmonds et al. | 707/201 |
| 5,944,780 A | * | 8/1999 | Chase et al. | 709/201 |
| 5,996,014 A | * | 11/1999 | Uchihori et al. | 709/226 |
| 5,999,712 A | * | 12/1999 | Moiin et al. | 709/220 |
| 6,018,567 A | * | 1/2000 | Dulman | 379/32.03 |
| 6,052,694 A | * | 4/2000 | Bromberg | 707/200 |
| 6,055,543 A | * | 4/2000 | Christensen et al. | 707/104.1 |
| 6,282,616 B1 | * | 8/2001 | Yoshida et al. | 711/133 |
| 6,338,064 B1 | * | 1/2002 | Ault et al. | 707/9 |
| 6,338,146 B1 | * | 1/2002 | Johnson et al. | 714/4 |
| 6,457,063 B1 | * | 9/2002 | Chintalapati et al. | 709/317 |
| 6,470,388 B1 | * | 10/2002 | Niemi et al. | 709/224 |
| 6,487,547 B1 | * | 11/2002 | Ellison et al. | 707/2 |
| 6,507,844 B1 | * | 1/2003 | Leymann et al. | 707/8 |
| 2002/0032699 A1 | * | 3/2002 | Edwards et al. | 707/513 |
| 2002/0124082 A1 | * | 9/2002 | San Andres et al. | 709/225 |
| 2002/0133412 A1 | * | 9/2002 | Oliver et al. | 705/26 |
| 2002/0169867 A1 | * | 11/2002 | Mann et al. | 709/224 |

* cited by examiner

CENTRALIZED LOGGING OF GLOBAL RELIABILITY, AVAILABILITY, AND SERVICEABILITY (GRAS) SERVICES DATA FOR A DISTRIBUTED ENVIRONMENT AND BACKUP LOGGING SYSTEM AND METHOD IN EVENT OF FAILURE

BACKGROUND OF THE INVENTION

1. Technical Field

The present invention relates in general to logging of global reliability, availability, and serviceability (GRAS) services, data, and, in particular, to centralized logging of GRAS services data for runtime environments in a distributed environment. Still particularly, the present invention relates to providing a backup logging system and method in the event of a failure in the centralized logging system and method.

2. Description of the Related Art

Services for providing and maintaining reliability, availability, and serviceability (RAS) information (i.e. RAS services) for an individual runtime environment (RTE) logger or tracer or RTE application or system (hereinafter referred to as "RTE systems"), such as servers, computer systems, data processing systems, etc., are well known in the art. Data relating to RAS services of an RTE logger or tracer are typically logged and maintained in a log in the respective RTE system itself when RAS services are performed. RAS services generate related RAS services data such as "System Messages" (messages that are to be translated and that are system-wide in nature), "System Errors" (error messages that are not translated), and "System Trace"(trace statements) data. RAS services generate information that includes data relating to the state of the RTE system. RAS services, RAS services data, and such logs for maintaining the RAS services data are well known in the art.

These RAS services data may be utilized by maintenance service providers or personnel or accessed by other systems or devices to obtain pertinent information about the RTE system (i.e. relating to the RAS services). When RAS services are being utilized or performed within or to the RTE system, the log of data relating to the RAS services is continuously updated and provided with information relating to the respective RAS services. The maintenance and updating of this log on the local RTE system may be considered intrusive or as litter to the local RTE system.

In a distributed or networked system, RAS services may need to be accessed by other networked systems or devices or by related personnel. These networked systems or devices or related personnel sometimes may not be able access some of the RTE systems to obtain information from their RAS logs. Also, if the networked systems or devices are able to access the RAS logs, then these networked systems or devices have to separately search, find, and access each of the various RTE systems for their individual logs. The search and access processes may be quite cumbersome and tedious. Thus, it would be desirable to provide a centralized system and method, such as providing and using a global centralized RAS manager, for centrally maintaining and managing logs of RAS services data for RTE systems in a distributed environment.

Furthermore, in the distributed or networked system, entire segments of the distributed system or network may become unavailable or go down due to failure, or critical systems may become unavailable due to network or system resource failure. Such systems or segments that go down due to failure may affect the centralized RAS manager, the centralized logging of RAS services data, and the providing of such RAS services. Thus, it would be desirable to provide a backup logging system and method for centralized RAS services data in the event of a failure.

It would therefore be advantageous and desirable to provide a system and method for centralized logging of GRAS services data for RAS services in a distributed or networked system. It would also be advantageous and desirable to provide a backup logging system and method in the event of a failure in the centralized logging system and method. It would further be advantageous and desirable for providing a system and method that allows an RTE system to self-configure and self-modify itself to designate that it has the GRAS manager for centralized logging system and method in the event of a failure.

SUMMARY OF THE INVENTION

It is therefore one object of the present invention to provide a system and method for centralized logging of GRAS services data for RAS services in a distributed or networked system.

It is another object of the present invention to provide a backup logging system and method in the event of a failure in the centralized logging system and method.

It is a further object of the present invention to provide a system and method that allows an RTE system to self-configure and self-modify itself to designate that it has a GRAS manager for centralized logging system and method in the event of a failure.

The foregoing objects are achieved as is now described. The present system and method logs global reliability, availability, and serviceability (GRAS) services data for runtime environment (RTE) systems or applications in a central repository within a distributed environment. A backup logging system and method in the event of a failure or error in the centralized logging system and method are also provided. An RTE system allows itself to self-configure and self-modify itself to designate that it has a GRAS manager for centralized logging system and method in the event of a failure or error. The RTE systems are directed to log the GRAS services data to a central repository managed and maintained by a designated GRAS manager. The GRAS manager manages and maintains the logged GRAS services data in the central repository for the RTE applications, and the GRAS manager references to access the central repository by the RTE applications for the GRAS services data that are related to respective GRAS services of the RTE applications. A shared namespace is referenced and shared by and published among the RTE applications. At least one other GRAS manager is searched for in an event of failure of the GRAS manager, and at least one other GRAS manager is designated in place of the designated GRAS manager in the event of the failure of the GRAS manager.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present system and method logs global reliability, availability, and serviceability (GRAS) services data for runtime environment (RTE) systems or applications (hereafter referred to as "RTE systems") in a central repository within a distributed environment. The present invention also provides a backup logging system and method in the event of a failure or error in the centralized logging system and method. The present invention further provides a system and method that allows an RTE system to self-configure and self-modify itself to have itself designated a GRAS manager for centralized logging system and method in the event of a failure or error.

The RTE systems are directed to log the GRAS services data to the central repository that is managed and maintained by a designated GRAS manager instead of having the GRAS services data logged and maintained within the respective individual RTE systems themselves. The GRAS manager manages and maintains the logged GRAS services data in the central repository for the RTE systems. The RTE applications through program objects of RTEs within the RTE systems reference the GRAS manager to access the central repository for the GRAS services data that are related to respective GRAS services of the RTE systems.

A shared namespace within the distributed environment is set up and used in order to be referenced and shared by and published among the RTE systems. The shared namespace comprises references to the respective GRAS services of the corresponding RTE systems and a GRAS manager reference that references the designated GRAS manager that manages and maintains the GRAS services data and the shared namespace. The present system and method determines whether the RTE applications have shared namespace references to the shared namespace. The shared namespace references are set up for the RTE applications if the RTE applications do not have the shared namespace references.

Furthermore, in the event of a failure or error that affects the performance of the presently designated GRAS server, the present system and method searches for at least one other GRAS manager that is then designated as a backup GRAS manager for providing the backup centralized logging system and method. One or more of the other GRAS managers is/are possibly designated as a GRAS manager in place of the presently designated GRAS manager in the event of the failure or error. If more than one other GRAS managers have been designated as the designated GRAS manager, an election and merging processes are implemented to select the RTE system that is to act as the newly designated GRAS manager and to merge the data and configuration of the other RTE system into the newly designated GRAS manager.

Figure 1:
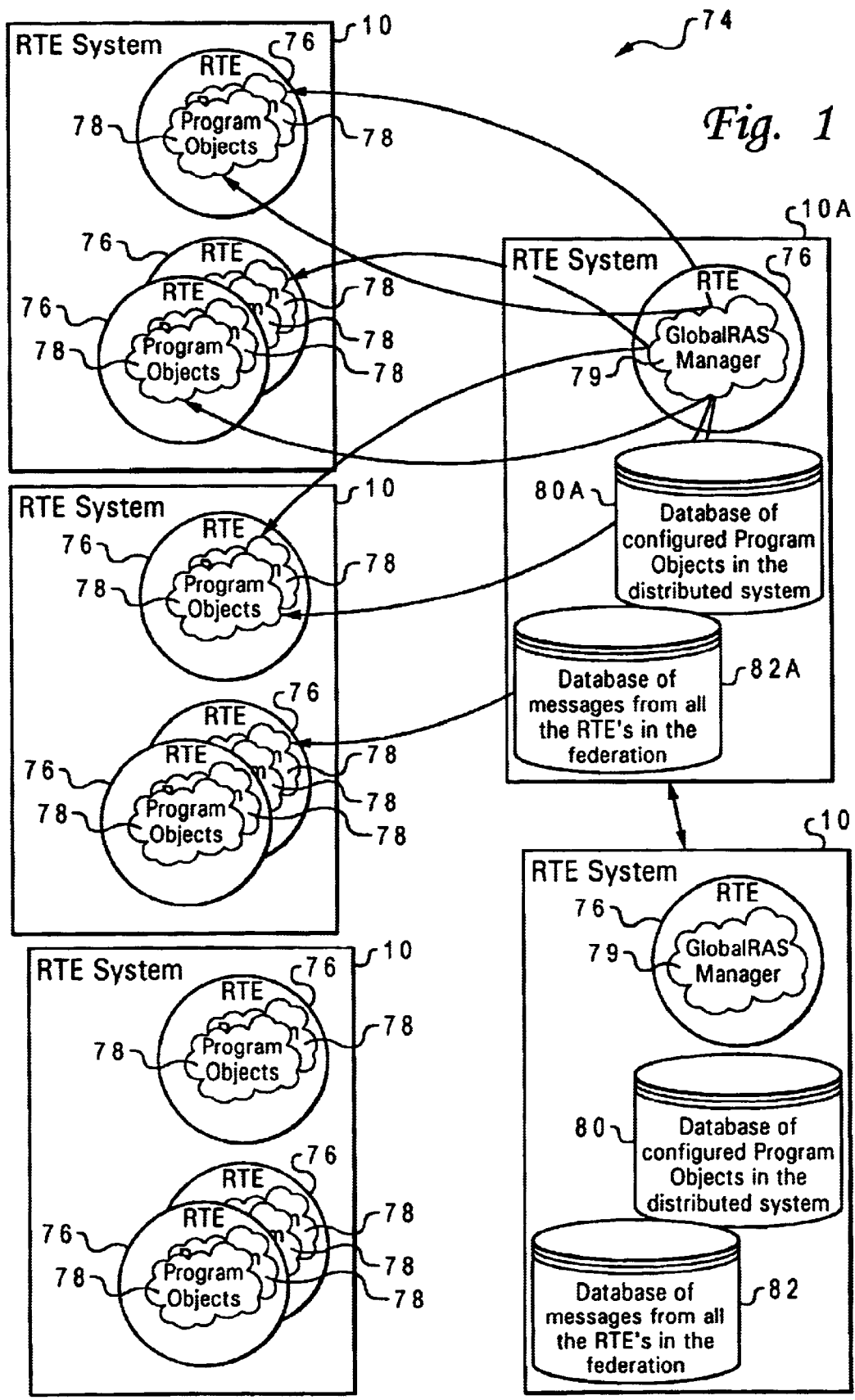
FIG. 1 is a block diagram of a distributed environment showing a global reliability, availability, and serviceability (GRAS) manager used to centrally log and access GRAS services data for RAS services of various runtime environment (RTE) systems in the distributed environment.

With reference now to the figures and in particular with reference to FIG. 1, a block diagram of a distributed environment 74 with a GRAS manager 79 that is in one of a number of RTEs 76 within one of a number of RTE systems 10 is shown. The GRAS manager 79 is used to centrally log and access GRAS services data for RAS services of various runtime environment (RTE) systems 10 and 10A in the distributed environment 74 in databases 80 and 82, which make up the central repository. The RTE systems 10 and 10A are coupled to and in communication with each other within the distributed environment 74.

FIG. 1 shows that the (i.e. top, right) RTE system 10A contains the GRAS manager 79 that acts to collect, maintain, update, and provide when necessary GRAS services data related to GRAS services for itself and for other RTE systems 10. FIG. 1 shows that the other (i.e. three left) RTE systems 10 each comprise RTEs 76 that have program objects 78. The RTE system 10A with the GRAS manager 79 is a program object 78 that is set up to access program objects 78 within its own RTE(s) 76 and from other RTE(s) 76 in other systems 10 in order to obtain, maintain, and update the respective GRAS services data relating to corresponding GRAS services therefrom. FIG. 1 shows that the GRAS manager 79 manages and maintains the GRAS services data for various GRAS services in the databases 80A and 82A. The database or log 80A stores GRAS services data relating to the configured program objects 78 in the distributed environment 74, and a database or log 82A stores GRAS services data relating to messages from all of the RTEs 76 in the entire distributed system or network 74 (i.e. federation). The GRAS manager 79 manages and maintains GRAS services data relating to all of the program objects 78 in the entire distributed system or network 74 (i.e. federation). Thus, the GRAS manager 79 is able to obtain information and messages from the program objects 78 and store the information in the database 80A and the messages in the database 82A (i.e. the central repository for GRAS services data).

Therefore, any other system, device, or personnel is able to request and obtain GRAS services data in the central repository (i.e. databases 80A and 82A in FIG. 1) through the global RAS manager 79 and is able to provide or perform such GRAS services therefrom so long as the RTE system 10A with the GRAS manager 79 is available and free from any failures or errors for accessing the GRAS manager 79. Thus, the block diagram showing the distributed environment 74 shows that the present invention provides a system and method that creates and maintains a central repository for the location of GRAS services data, such as "System Messages", "System Errors", and "System Trace" data. By creating a central repository for logging GRAS services data, other systems, devices, and related personnel are able to more easily locate and access information about the state of an RTE 76 within an RTE system 10. Logs of the GRAS services data thus do not have to be necessarily left on the individual RTE systems 10 themselves.

Figure 2:
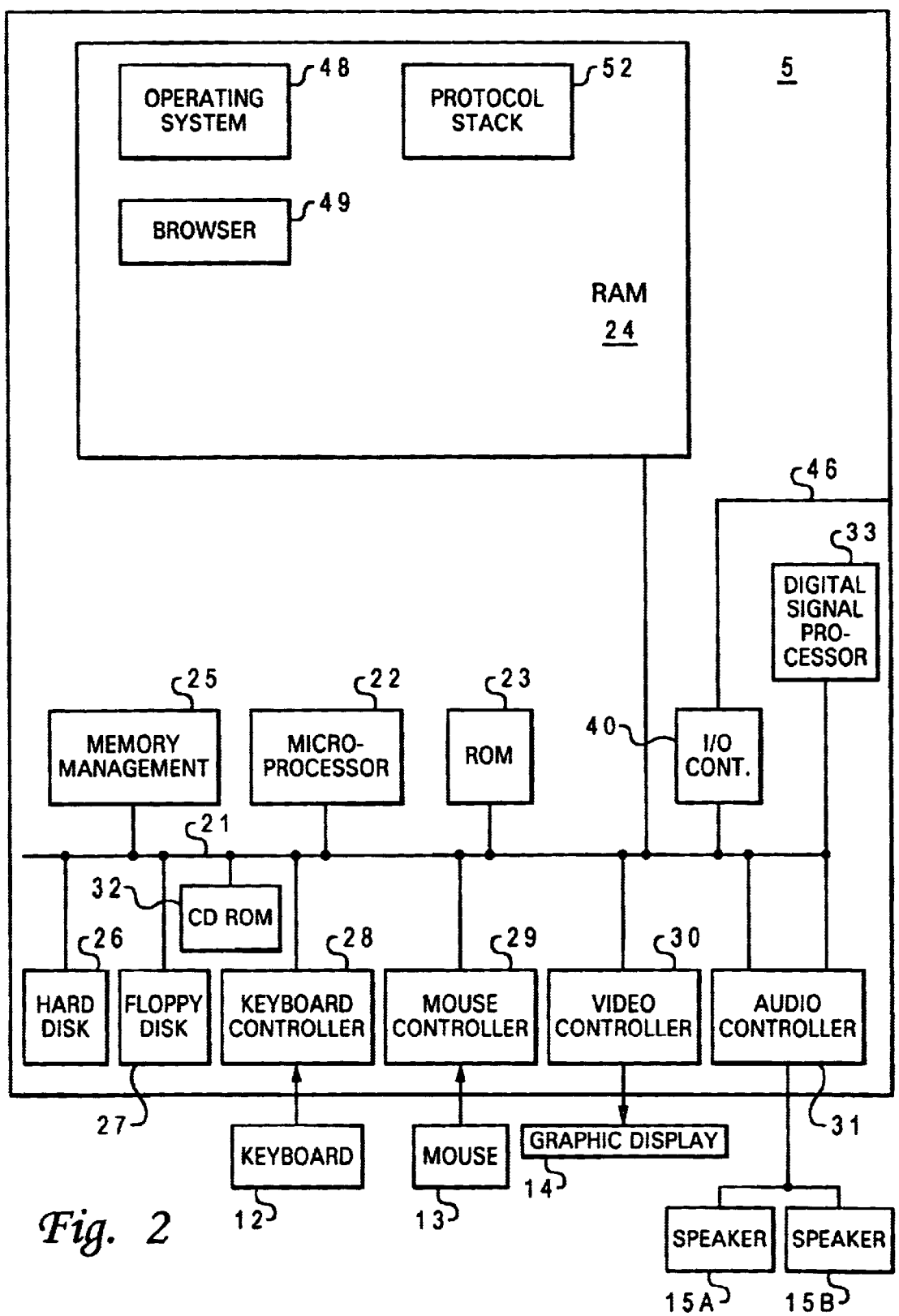
FIG. 2 is a block diagram of an example hardware system for each of the RTE systems that is used within the distributed environment of FIG. 1.

With reference now to the figures and in particular with reference to FIG. 2, an overall block diagram of an example hardware system 5, that may be the RTE system 10 or 10A used within the distributed environment 74 of FIG. 1, is shown. The hardware system 5 has a number of sub-systems in communications with or to each other on a communications bus 21. The various sub-systems coupled to the bus 21 include but are not limited to the following systems or devices: a memory management system 25, a microprocessor 22, a read only memory (ROM) system 23, a random access memory (RAM) system 24, an input/output controller (I/O CONT.) 40, a digital signal processor 33, a hard disk 26, a floppy disk 27, a CD ROM 32, a keyboard controller 28, a mouse controller 29, a video controller 30, and an audio controller 31. The I/O CONT. 40 provides communications to an input/output device via line 46. A keyboard 12 is coupled to the keyboard controller 28. A mouse 13 is coupled to the mouse controller 29. A graphic display 14 is coupled to the video controller 30. Speakers 15A and 15B are coupled to the audio controller 31. The RAM system 24 is divided into at least the following memory allocations: 1) operating system 48; 2) protocol stack 52; and 3) a browser or web browser 49. The present invention is not in any way limited to the specific hardware disclosed above for the RTE system 10 or 10A, and any suitable system, sub-system, and/or device may be used to implement the present invention or in conjunction with the present invention.

Figure 3:
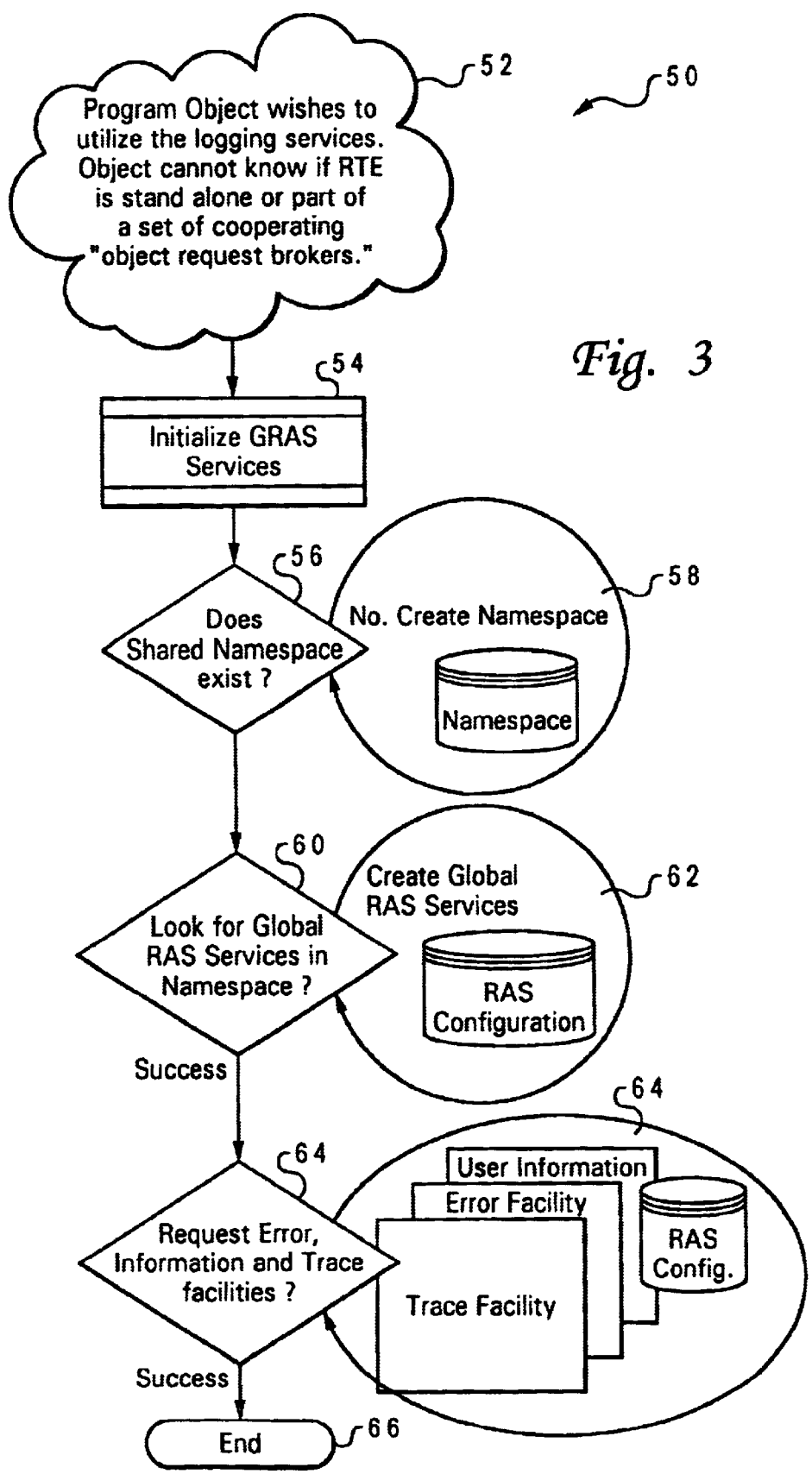
FIG. 3 is a flow chart of a method for implementing the present invention central logging, managing, maintaining of GRAS services data relating to GRAS services for RTE systems in a distributed environment.

With reference now to the figures and in particular with reference to FIG. 3 and also FIG. 1, a flow chart of a method 50 for implementing the present invention central logging, managing, maintaining of GRAS services data relating to GRAS services for RTE systems 10 in a distributed environment 74 is shown. The method 50 starts at block 52. At block 52, a program object 78 in a RTE 76 of a RTE system 10 needs or desires to write GRAS services data to the central repository. The program object 78 is not able to know whether the RTE system 10 is stand alone by itself or part of a set of cooperating "object request brokers". The method 50 moves to decision block 54 where the RTE system 10 with the program object 78 is initialized for the GRAS services. The initialization involves setting up the central repository that includes the databases 80 and 82 and the GRAS manager 79 that manages the central repository.

Figure 4:
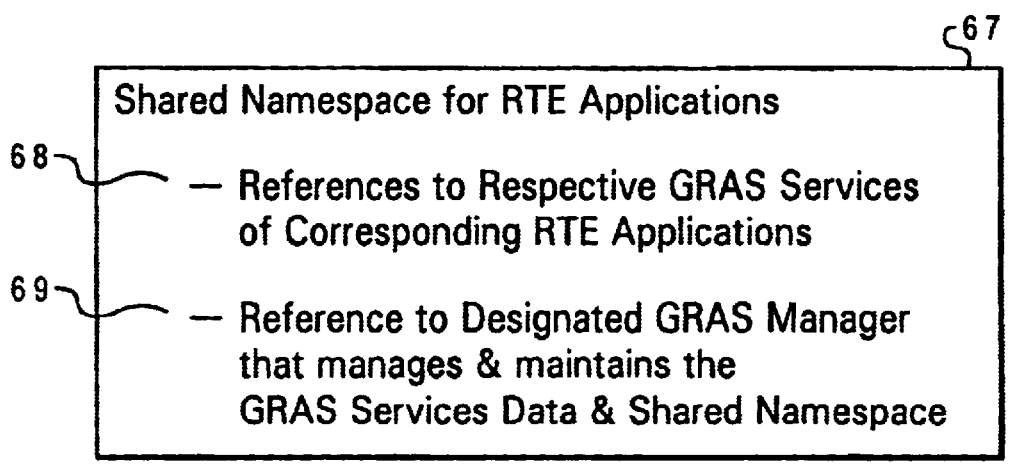
FIG. 4 is a block diagram showing a general format of a shared namespace used for implementing the present invention.

The method 50 then moves to decision block 56. At decision block 56, the method 50 determines whether a shared namespace (such as the shared namespace 67 shown in FIG. 4) exists within the distributed environment 74 for the GRAS services of various RTE systems 10. If such a shared namespace does not exist, then the method 50 moves to block 58 where a shared namespace is created and the method 50 then moves to decision block 60. With reference now to the figures and in particular with reference to FIG. 4, a block diagram showing a general format of a shared namespace 67 used for implementing the present invention is shown. The shared namespace 67 comprises references 68 to respective GRAS services of corresponding RTE systems 10 and a GRAS manager reference 68 that references the designated GRAS manager 79 that manages and maintains the GRAS services data for the GRAS services in the databases 80 and 82 (i.e. central repository) and the shared namespace 67. The shared namespace 67 is referenced and published among the RTE systems 10 in the distributed environment 74. The RTE system(s) 10 is/are set up to reference the shared namespace 67 by determining whether the RTE system(s) 10 has/have the respective shared namespace reference(s) to the shared namespace 67. If the RTE system(s) 10 does/do not have the shared namespace reference(s), then the shared namespace reference(s) is/are respectively set up in the respective RTE system(s) 10.

Otherwise, if such a shared namespace (i.e. shared namespace 67) does exist at decision block 56, the method 50 directly moves to decision block 60. At decision block 60, the method 50 determines whether GRAS service(s) for the program object 78 is/are referenced in the shared namespace 67. If such GRAS service(s) is/are not referenced in the shared namespace, then the method 50 moves to block 62 where reference(s) to the GRAS service(s) is/are created and added to the central repository.

The method 50 moves to decision block 64 to determine whether a facility, such as an error, information, or trace facility has been requested by the program object 78. The request for a facility determines whether the requesting program object 78 with the GRAS services data is/are participating in the distributed environment 74. If such facility or facilities does/do not exist, then the method 50 skips writing the GRAS services data to the central repository and ends at block 66 (and may just write the GRAS services data to the local RTE system 10 of the requesting program object 78). On the other hand, if such facility or facilities does/do exist, then the method 50 writes the GRAS services data to the central repository. The RAS configuration of the program object 78 is/are stored in the database 80, and message(s) of the program object 78 is/are stored in the database 82. The algorithm ends at block 66.

Figure 5:
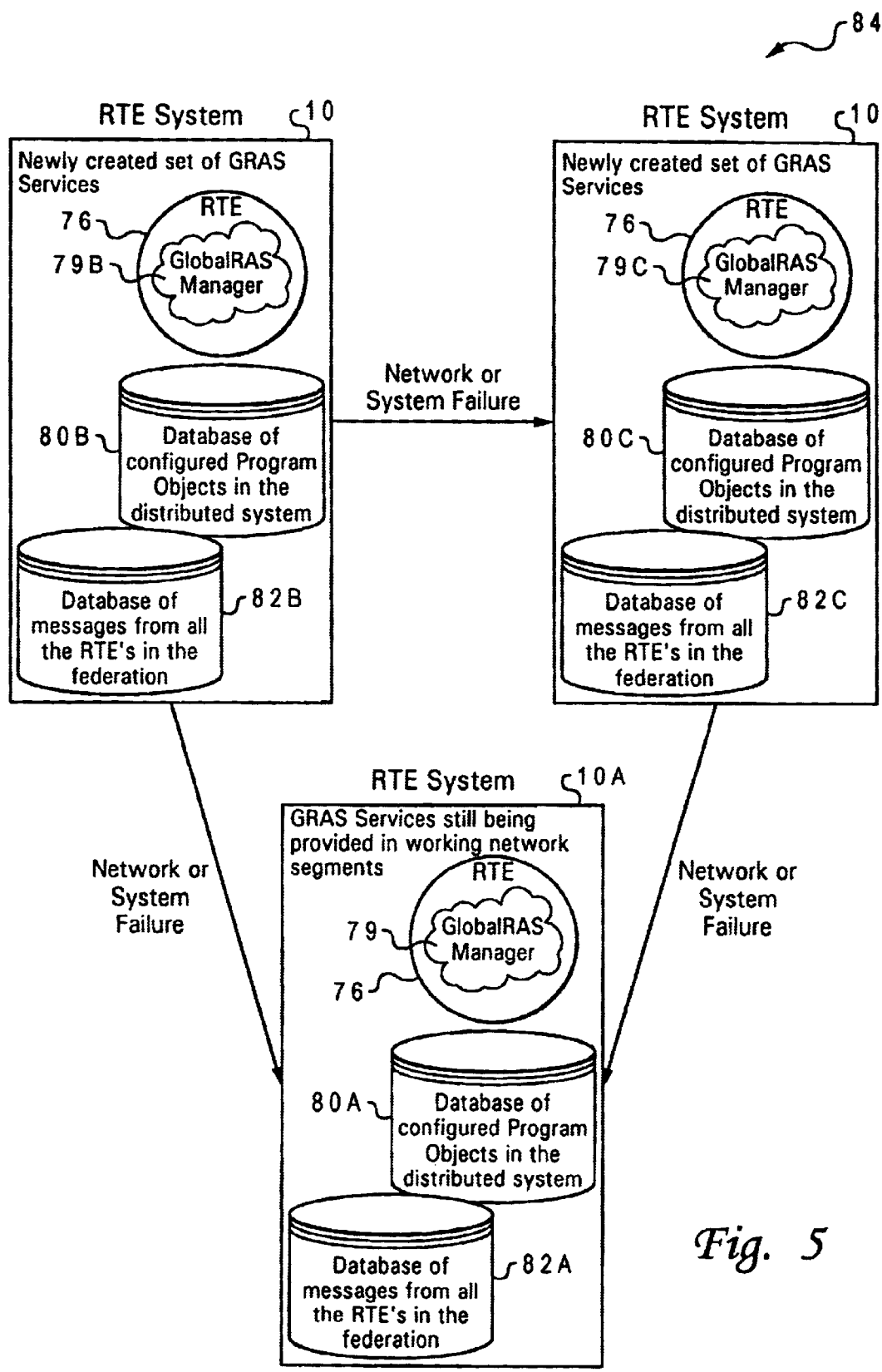
FIG. 5 is a block diagram illustrating RTE systems and the designated GRAS manager in one of the RTE systems in the distributed environment handling a failure or error occurring that affects the designated GRAS managerG.

As stated earlier, a backup logging system and method in the event/occurrence of a failure or error that has affected the present centralized logging system and method is also provided. The present system and method allows an RTE system to self-configure and self-modify itself to becoming a GRAS manager for centralized (i.e. backup) logging system in place of the failure-effected centralized logging system and method in the event of failure or error. With reference now to the figures and in particular with reference to FIG. 5, a block diagram 84 illustrating RTE systems 10 and the RTE system 10A with GRAS manager 79 within a distributed environment handling a failure or error occurring that affects the designated GRAS manager 79 providing logging services of GRAS services data to the two RTE systems 10 is shown. FIG. 5 shows the RTE system 10A coupled to and in communications with the two RTE systems 10. A failure or error occurs that affects the GRAS manager 79 in the RTE system 10A in providing logging of GRAS services data for the two RTE systems 10. The arrows illustrate that the failure or error causes the two RTE systems 10 from accessing and obtaining requested GRAS services from the RTE system 10A with the GRAS manager 79. When the failure or error occurs, the two RTE systems 10 may begin to initialize respectively and newly create sets of GRAS services. The two RTE systems 10 also begin to set up respective GRAS managers 79B and 79C, respective databases 80B and 80C for configured RAS objects in the distributed system environment 74 (i.e. federation), and respective databases 82B and 82C for messages from all of the RTEs 76 in the distributed system or network 74 (i.e. federation).

The two RTE systems 10 requesting GRAS services attempt to locate another RTE system 10 with another GRAS manager that is already using the shared namespace for the respective GRAS services. These attempts continue at a pre-determined rate until the local RTE system 10 is successful at locating another such RTE system 10 or a search timeout period has been reached. Since many RTEs 76 may be affected by the outage caused by failure or error, the attempts for locating another such RTE 10 with another GRAS manager must be staggered to prevent a firestorm of network traffic. If the search timeout period has been reached and the local RTE system 10 has been successful in locating and communicating with another RTE server 10 with another GRAS manager (i.e. GRAS manager 79B or 79C) already using the shared namespace 67, then this other RTE server 10 with this other GRAS manager is used as the newly designated GRAS manager. On the other hand, if the search timeout period has been reached and the local RTE system 10 has been unsuccessful in locating and communicating with another RTE server 10 with another GRAS manager already using the shared namespace 67, then the local RTE system 10 designates and publishes itself as the RTE system 10 with the newly designated (i.e. backup) GRAS manager 10A and begin accepting requests and handling for centrally logging and managing GRAS services data. In FIG. 5, the two RTE systems 10 may either or both begin to publish itself/themselves as having the newly designated global GRAS manager depending on the locking available within the shared namespace 67 or when network segments are re-connected. The RTE system 10A may not be able to provide logging of GRAS services data for the two systems 10, but it may still be able to provide logging of GRAS services data to other working network segments of the distributed environment 74.

As discussed for FIG. 5, depending on the locking that is available within the namespace or when network segments are reconnected, the possibility of more than one RTE system 10 having published itself as having the designated GRAS manager (i.e. GRAS manager 79A or 79B) may have occurred. The GRAS services are configured with an "election time" parameter, which checks the shared namespace and reports if other GRAS managers have been created.

Figure 6:
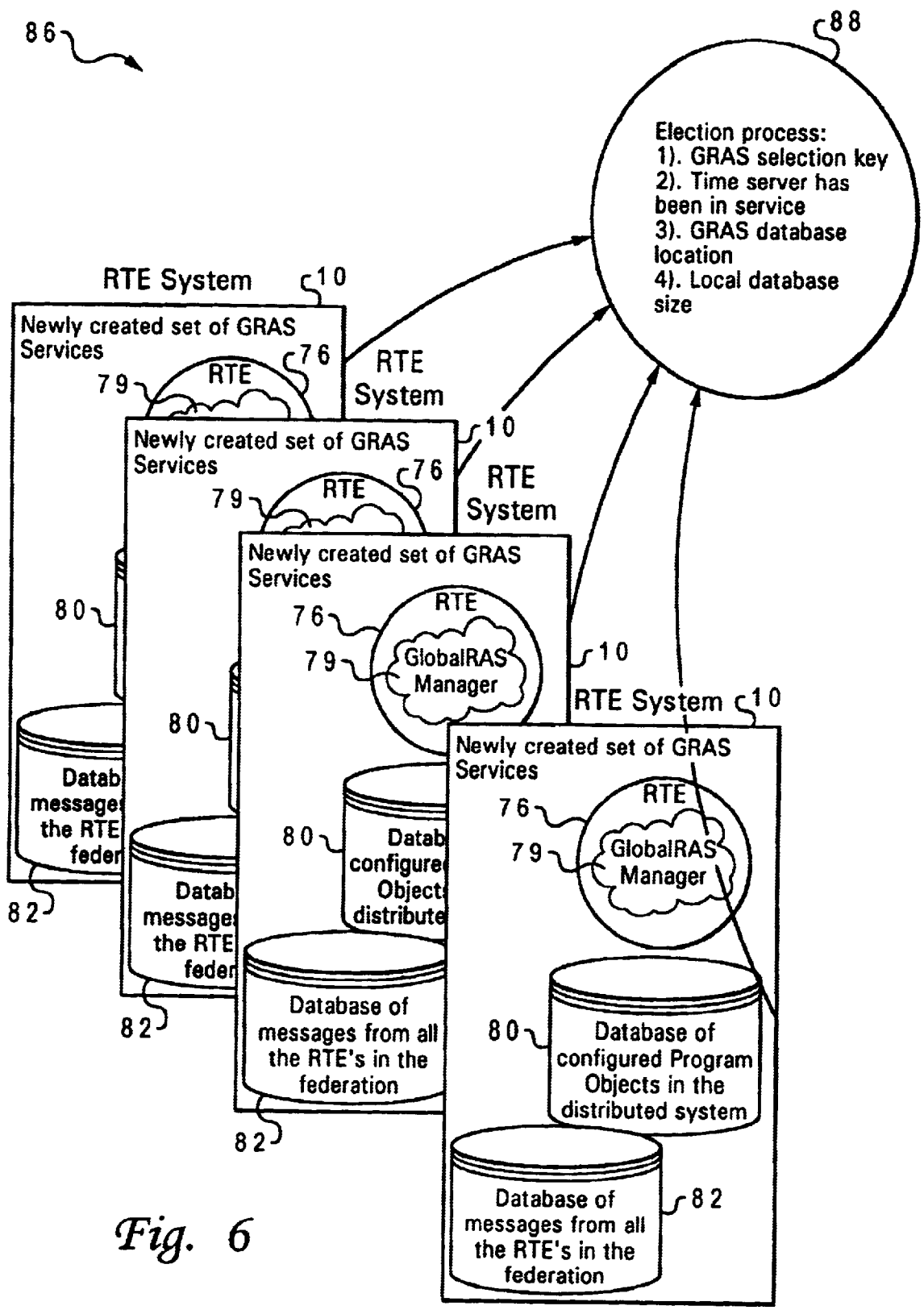
FIG. 6 is a block diagram illustrating selection and merging of data and configuration of an elected backup GRAS manager in place of the designated GRAS manager that has been affected by a failure or error.

With reference now to the figures and in particular with reference to FIG. 6, a block diagram 86 illustrating selection and merging of data and configuration of an elected backup GRAS manager in place of the designated GRAS manager that has been affected by a failure or error is shown. The block diagram shows various RTE systems 10 that have each designated itself as having the designated GRAS manager for accepting and handling requests for logging GRAS services data. When other designated GRAS managers are discovered, the election is held to determine which of the designated GRAS managers is to be selected as the single, primary GRAS manager at a respective one of the RTE systems 10. FIG. 6 shows block 88 that outlines various factors that are considered in the election process. These factors include but are not limited to: 1) GRAS selection key; 2) the time that the RTE system 10 with its designated GRAS manager has been in service; 3) the database location for the GRAS services data; 4) the local database size of the RTE system 10. This election process may also be based on heuristic factors. Thus, the present invention is not in any way limited to the specific election or heuristic factors disclosed, and any suitable election method and heuristic factors may be used with the present invention.

After the unification election has been held and determination for a primary GRAS manager associated to a primary one of the RTE systems 10 has been made, the other RTE systems 10 begin merging their data and configuration with the elected primary RTE system 10. The merging of messages is based on Greenwich Mean Time (GMT) time messages that were generated. The merging of configuration data is based on Greenwich Mean Time (GMT) of the last change of the configuration. The messages are merged, and the configuration data is/are then sent from the other RTE systems 10 to the elected primary system 10.

While the invention has been particularly shown and described with reference to a preferred embodiment, it will be understood by those skilled in the art that various changes in form and detail may be made therein without departing from the spirit and scope of the invention.

What is claimed is:

1. A method of logging global reliability, availability, and serviceability (GRAS) services data for runtime environment (RTE) applications in a distributed environment, said method comprising:

directing the RTE applications to log the GRAS services data to a central repository, a designated GRAS manager managing the logged GRAS services data in the central repository for the RTE applications, establishing a shared namespace separate from the central repository, wherein said shared namespace is referenced and shared by and published among the RTE applications, and wherein the shared namespace includes references to the respective GRAS services of the corresponding RTE applications and a GRAS manager reference that references the designated GRAS manager that manages the GRAS services data and the shared namespace, and said RTE applications referencing the designated GRAS manager to access the central repository for the GRAS services data that are related to respective GRAS services of the RTE applications, wherein said referencing includes the RTE applications obtaining the GRAS manager reference from the shared name space and utilizing the GRAS manager reference to reference the designated GRAS manager.

2. The method according to claim 1, further comprising:

determining whether the RTE applications have shared namespace references to the shared namespace, and setting up the shared namespace references for the RTE applications if the RTE applications do not have the shared namespace references.

3. The method according to claim 1, further comprising:

determining whether a specific reference of at least one specific GRAS service exists in the shared namespace, and creating and adding the specific reference if the specific reference does not exist in the shared namespace.

4. The method according to claim 2, further comprising:

searching for at least one other GRAS manager in an event of failure of the GRAS manager, and designating the at least one other GRAS manager in place of the designated GRAS manager in the event of the failure of the GRAS manager.

5. A method of logging global reliability, availability, and serviceability (GRAS) services data for runtime environment (RTE) applications in a distributed environment, said method comprising:

directing the RTE applications to log the GRAS services data to a central repository managed and maintained by a designated GRAS manager, establishing a shared namespace referenced and shared by and published among the RTE applications, and wherein the shared namespace includes references to the respective GRAS services of the corresponding RTE applications and a GRAS manager reference that references the designated GRAS manager that manages and maintains the GRAS services data and the shared namespace, determining whether the RTE applications have shared namespace references to the shared namespace, setting up the shared namespace references for the RTE applications if the RTE applications do not have the shared namespace references;

managing and maintaining, by the GRAS manager, the logged GRAS services data in the central repository for the RTE applications, referencing the GRAS manager to access the central repository by the RTE applications for the GRAS services data that are related to respective GRAS services of the RTE applications, in an event of failure of the GRAS manager to log GRAS services data to the central repository in response to a request by one of the RTE applications:

searching, by the one of the RTE applications, for at least one other GRAS manager that has already been designated as a newly designated GRAS manager and uses the shared namespace, using the at least one other GRAS manager as the designated GRAS manager if the at least one other GRAS manager is found within a search timeout period, and designating and publishing the one of the RTE applications to operate as the at least one other GRAS manager if the at least one other GRAS manager is not found within the search timeout period.

6. The method according to claim 5, wherein designating and publishing the one of the RTE application as the at least one other GRAS manager comprises designating multiple other GRAS managers in place of the GRAS manager, said method further comprising:

performing an election to determine an elected GRAS manager among the multiple other GRAS managers that is to be newly designated as the designated GRAS manager, and merging respective data and data configurations of a remaining number of the multiple other GRAS managers with the elected GRAS manager after the elected GRAS manager has been elected.

7. A system for logging global reliability, availability, and serviceability (GRAS) services data for runtime environment (RTE) applications in a distributed environment, said system comprising:

a central repository in which GRAS services data of the RTE applications is logged, a GRAS manager for managing the logged GRAS services data in the central repository for the RTE applications, and a shared namespace separate from the central repository, wherein said shared namespace is referenced and shared by and published among the RTE applications, and wherein the shared namespace includes references to the respective GRAS services of the corresponding RTE applications and a GRAS manager reference that references the designated GRAS manager that manages the GRAS services data and the shared namespace, wherein the RTE applications obtain the GRAS manager reference from the shared namespace and utilizing the GRAS manager reference to reference the designated GRAS manager in order to access the central repository for the GRAS services data related to respective GRAS services of the RTE applications.

8. The system according to claim 7, further comprising:

means for determining whether the RTE applications have shared namespace references to the shared namespace, and means for setting up the shared namespace references for the RTE applications if the RTE applications do not have the shared namespace references.

9. The system according to claim 7, further comprising:

means for determining whether a specific reference of at least one specific GRAS service exists in the shared namespace, and means for creating and adding the specific reference if the specific reference does not exist in the shared namespace.

10. The system according to claim 8, further comprising:

means for searching for at least one other GRAS manager in an event of failure of the GRAS manager, and means for designating the at least one other GRAS manager in place of the designated GRAS manager in the event of the failure of the GRAS manager.

11. A system for logging global reliability, availability, and serviceability (GRAS) services data for runtime environment (RTE) applications in a distributed environment, said system comprising:

a central repository in which GRAS services data of the RTE applications is logged, a GRAS manager for managing the logged GRAS services data in the central repository for the RTE applications, a shared namespace separate from the central repository, wherein said shared namespace is referenced and shared by and published among the RTE applications, and wherein the shared namespace includes references to the respective GRAS services of the corresponding RTE applications and a GRAS manager reference that references the designated GRAS manager that manages the GRAS services data and the shared namespace, wherein the RTE applications obtain the GRAS manager reference from the shared namespace and utilizing the GRAS manager reference to reference the designated GRAS manager in order to access the central repository for the GRAS services data related to respective GRAS services of the RTE applications, responsive to failure of the GRAS manager to log GRAS services data to the central repository in response to a request by one of the RTE applications:

means for searching, by the one of the RTE applications, for the at least one other GRAS manager that has already been designated as a newly designated GRAS manager and uses the shared namespace, means for using the at least one other GRAS manager as the designated GRAS manager if the at least one other GRAS manager is found within a search timeout period, and means for designating and publishing the one of the RTE applications to operate as the at least one other GRAS manager if the at least one other GRAS manager is not found within the search timeout period.

12. The system according to claim 11, wherein the at least one other GRAS manager comprises multiple other GRAS managers that have been designated and published, said system further comprising:

means for performing an election to determine an elected GRAS manager among the multiple other GRAS managers that is to be newly designated as the designated GRAS manager, and means for merging respective data and data configurations of a remaining number of the other multiple GRAS managers with the elected GRAS manager after the elected GRAS manager has been elected.

13. A program product for logging global reliability, availability, and serviceability (GRAS) services data for runtime environment (RTE) applications in a distributed environment, said program product comprising a computer usable medium including:
- instruction means for establishing a central repository in which to log GRAS services data of the RTE applications,
- a GRAS manager for managing the logged-GRAS services data in the central repository for the RTE applications, and
- instruction means for establishing a shared namespace separate from the central repository, wherein said shared namespace is referenced and shared by and published among the RTE applications, and wherein the shared namespace includes references to the respective GRAS services of the corresponding RTE applications and a GRAS manager reference that references the designated GRAS manager that manages the GRAS services data and the shared namespace, and
- instruction means for referencing the GRAS manager to access the central repository for the GRAS services data that are related to respective GRAS services of the RTE applications, wherein the instruction means for referencing include instruction means for obtaining the GRAS manager reference from the shared namespace and for utilizing the GRAS manager reference to reference the designated GRAS manager in order to access the central repository.

14. The program product according to claim 13, further comprising:
- instruction means for determining whether the RTE applications have shared namespace references to the shared namespace, and
- instruction means for setting up the shared namespace references for the RTE applications if the RTE applications do not have the shared namespace references.

15. The program product according to claim 13, further comprising:
- instruction means for determining whether a specific reference of at least one specific GRAS service exists in the shared namespace, and
- instruction means for creating and adding the specific reference if the specific reference does not exist in the shared namespace.

16. The program product according to claim 13, further comprising:
- instruction means for searching for at least one other GRAS manager in an event of failure of the GRAS manager, and
- instruction means for designating the at least one other GRAS manager in place of the designated GRAS manager in the event of the failure of the GRAS manager.

17. A program product residing on a computer usable medium for logging global reliability, availability, and serviceability (GRAS) services data for runtime environment (RTE) applications in a distributed environment, said program product comprising a computer usable medium including:
- instruction means for establishing a central repository in which to log GRAS services data of the RTE applications,
- a GRAS manager for managing the logged GRAS services data in the central repository for the RTE applications, and
- instruction means for establishing a shared namespace separate from the central repository, wherein said shared namespace is referenced and shared by and published among the RTE applications, and wherein the shared namespace includes references to the respective GRAS services of the corresponding RTE applications and a GRAS manager reference that references the designated GRAS manager that manages the GRAS services data and the shared namespace, and
- instruction means for referencing the GRAS manager to access the central repository for the GRAS services data that are related to respective GRAS services of the RTE applications, wherein the instruction means for referencing include instruction means for obtaining the GRAS manager reference from the shared namespace and for utilizing the GRAS manager reference to reference the designated GRAS manager in order to access the central repository,
- instruction means, responsive to a failure of the GRAS manager to log GRAS services data to the central repository in response to a request by one of the RTE applications, for:
  - searching, by the one of the RTE applications, for the at least one other GRAS manager that has already been designated as a newly designated GRAS manager and uses the shared namespace,
  - using the at least one other GRAS manager as the designated GRAS manager if the at least one other GRAS manager is found within a search timeout period, and
  - designating and publishing the one of the RTE applications to operate as the at least one other GRAS manager if the at least one other GRAS manager is not found within the search timeout period.

18. The program product according to claim 17, wherein the at least one other GRAS manager comprises multiple other GRAS managers that have been designated and published, said program product further comprising:
- instruction means for performing an election to determine an elected GRAS manager among the multiple other GRAS managers that is to be newly designated as the designated GRAS manager, and
- instruction means for merging respective data and data configurations of a remaining multiple other GRAS managers with the elected GRAS manager after the elected GRAS manager has been elected.

* * * * *